United States Patent
Jiao et al.

(10) Patent No.: US 10,470,207 B2
(45) Date of Patent: Nov. 5, 2019

(54) CONTROL INFORMATION SENDING METHOD, DATA BLOCK TRANSMISSION METHOD, AND RELATED APPARATUS

(71) Applicant: HUAWEI TECHNOLOGIES CO., LTD., Shenzhen (CN)

(72) Inventors: Shurong Jiao, Shanghai (CN); Meng Hua, Shanghai (CN); Wenquan Hu, Lund (SE); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 15/990,679

(22) Filed: May 27, 2018

(65) Prior Publication Data

US 2018/0279346 A1    Sep. 27, 2018

Related U.S. Application Data

(63) Continuation of application No. PCT/CN2015/095801, filed on Nov. 27, 2015.

(51) Int. Cl.
*H04W 72/12* (2009.01)
*H04L 1/18* (2006.01)

(52) U.S. Cl.
CPC ....... *H04W 72/1278* (2013.01); *H04L 1/1812* (2013.01)

(58) Field of Classification Search
CPC .. H04W 72/12; H04W 72/1278; H04L 1/1812
See application file for complete search history.

(56) References Cited

U.S. PATENT DOCUMENTS 8,504,008 B1 *  8/2013  Gossweiler, III .......................... H04M 1/72533
                                                                455/419
2007/0286146 A1 * 12/2007 Kuroda ................. H04L 1/0005
                                                                370/342

(Continued)

FOREIGN PATENT DOCUMENTS

CN          101001138 A       7/2007
CN          101465689 A       6/2009

(Continued)

OTHER PUBLICATIONS

Nokia Networks, More Discussion of Node B Pre-configuration. 3GPP TSG-RAN3 Meeting #87 Athens, Greece, Feb. 9-13, 2015, R3-150076, 2 pages.

*Primary Examiner* — Jenee Holland
(74) *Attorney, Agent, or Firm* — Kilpatrick Townsend & Stockton LLP

(57) ABSTRACT

This application discloses a control information sending method, a data block transmission method, and a related apparatus. The control information sending method in this application is used to schedule multiple transmission time intervals TTIs for data transmission, and the multiple TTIs include at least a first TTI and a second TTI. The method includes: generating first control information, where the first control information is partial control information required for scheduling each of the multiple TTIs; generating second control information, where the second control information is remaining control information, other than the first control information, in complete control information for scheduling the first TTI; and generating third control information, where the third control information is partial control information required for scheduling the second TTI, where the first control information and the third control information are (Continued)

corresponding to complete control information required for scheduling the second TTI.

20 Claims, 3 Drawing Sheets

(56) References Cited

U.S. PATENT DOCUMENTS

| | | | |
|---|---|---|---|
| 2008/0102846 A1* | 5/2008 | Kim | H04W 72/085 |
| | | | 455/450 |
| 2008/0311942 A1* | 12/2008 | Kim | H04L 1/1854 |
| | | | 455/509 |
| 2010/0260164 A1* | 10/2010 | Moon | H04L 5/0007 |
| | | | 370/345 |
| 2011/0085457 A1* | 4/2011 | Chen | H04L 1/1812 |
| | | | 370/252 |
| 2013/0003672 A1* | 1/2013 | Dinan | H04L 1/00 |
| | | | 370/329 |
| 2013/0089068 A1 | 4/2013 | Kalhan | |
| 2013/0195039 A1* | 8/2013 | Pan | H04L 5/0007 |
| | | | 370/329 |
| 2015/0110055 A1 | 4/2015 | Lv et al. | |
| 2015/0327285 A1* | 11/2015 | Aida | H04L 47/20 |
| | | | 370/392 |
| 2016/0112892 A1* | 4/2016 | Damnjanovic | H04W 24/10 |
| | | | 370/336 |
| 2016/0113008 A1* | 4/2016 | Damnjanovic | H04W 72/042 |
| | | | 370/336 |
| 2016/0119948 A1* | 4/2016 | Damnjanovic | H04L 1/1812 |
| | | | 370/280 |
| 2016/0128095 A1* | 5/2016 | Damnjanovic | H04L 1/1812 |
| | | | 370/336 |
| 2017/0215187 A1* | 7/2017 | Panteleev | H04W 72/1278 |
| 2017/0251466 A1* | 8/2017 | Astely | H04L 5/0037 |

FOREIGN PATENT DOCUMENTS

| | | |
|---|---|---|
| CN | 102948107 A | 2/2013 |
| CN | 104426633 A | 3/2015 |
| CN | 104468030 A | 3/2015 |
| EP | 2750429 A1 | 7/2014 |
| EP | 3179654 A1 | 6/2017 |
| WO | 2014098700 A1 | 6/2014 |
| WO | 2015157565 A1 | 10/2015 |

* cited by examiner

CONTROL INFORMATION SENDING METHOD, DATA BLOCK TRANSMISSION METHOD, AND RELATED APPARATUS

CROSS-REFERENCE TO RELATED APPLICATIONS

This application is a continuation of International Application No. PCT/CN2015/095801, filed on Nov. 27, 2015, the disclosure of which is hereby incorporated by reference in its entirety.

TECHNICAL FIELD

The present application relates to the field of communications technologies, and in particular, to a control information sending method, a data block transmission method, and a related apparatus.

BACKGROUND

In discussion of the 5th generation 5-Generation, 5G for short) mobile communications standard, low latency is one of key indicators. This means that a transmission time interval (Transmission Time Interval, TTI for short) needs to be reduced, so as to accelerate hybrid automatic repeat request—acknowledgment (Hybrid Automatic Repeat request acknowledgment, HARQ-ACK) feedback and retransmission of data, and reduce end-to-end data latency.

In a conventional Universal Mobile Telecommunications System (Universal Mobile Telecommunications System, UMTS for short) or Long Term Evolution (Long Term Evolution, LTE for short) system, one TTI occupies several symbols, and the several symbols are used to send one data block. At a receive end, a demodulation and decoding operation is performed only when all symbols of one TTI are received, and corresponding acknowledgment (Acknowledgment, ACK for short) feedback and possible retransmission also need to be performed at a complete TTI. Using UMTS as an example, after receiving a high speed physical downlink shared channel (High Speed Physical Downlink Shared Channel, HS-PDSCH for short), user equipment (User Equipment, UE for short) performs demodulation and decoding and sends a feedback HARQ-ACK to a base station; the base station determines whether to perform retransmission or new transmission only after receiving the HARQ-ACK sent by the UE. For example, an earliest retransmission moment corresponding to a subframe 0 is a subframe 6. This is mainly restricted by a demodulation and decoding time of a user, a TTI length, and a subframe structure. Timing in LTE is similar.

Currently, a TTI in UMTS is 2 ms, and a TTI in LTE is 1 ms. A 5G low latency service is expected to reach a latency of less than 1 ms. This means that a TTI length needs to be decreased, to reach the target. For coexistence with the conventional LTE system, a conventional LTE frame structure can be used, and each original orthogonal frequency division multiplexing (Orthogonal Frequency Division Multiplexing, OFDM for short) symbol is used as a TTI. For example, in a short-TTI system, each symbol is only $\frac{1}{14}$ ms, and a round trip time (Round-Trip Time, RTT) is eight symbols (about 0.6 ms). This can reach the low-latency target with a latency of less than 1 ms. In another short-TTI system design, a time length of each symbol in a TTI may be reduced, and each TTI still includes several symbols. In this case, only a time length of the TTI needs to be controlled to meet a latency requirement.

An advantage of a short-TTI system is low latency because each TTI has a quite short time length, and HARQ-ACK and retransmission is quite fast. A disadvantage lies in that control overheads are relatively high. Especially for a single-symbol TTI, data sending for each symbol needs a corresponding pilot, scheduling information, and HARQ-ACK information, and in downlink, corresponding feedback information of channel state information (Channel State Information, CSI) is also required. Therefore, a large amount of control information needs to be delivered.

SUMMARY

This application provides a control information sending method, a data block transmission method, and a related apparatus, so as to reduce control signaling overheads.

According to a first aspect, this application provides a control information sending method, where the method is used to schedule multiple transmission time intervals TTIs for data transmission, and the multiple TTIs include at least a first TTI and a second TTI; and the method includes:

generating first control information, where the first control information is partial control information that is required for scheduling each of the multiple TTIs;

generating second control information, where the second control information is remaining control information, other than the first control information, in complete control information for scheduling the first TTI;

generating third control information, where the third control information is partial control information required for scheduling the second TTI, and the first control information and the third control information are corresponding to complete control information required for scheduling the second TTI; and sending the first control information, the second control information, and the third control information to user equipment UE.

In this application, when scheduling is performed for the UE to transmit a data block in the multiple TTIs, the first control information and the second control information for scheduling the first TTI and the third control information for scheduling the second TTI are separately generated. The first control information and the second control information form the complete control information for scheduling the first TTI, and the first control information and the third control information are corresponding to the complete control information required for scheduling the second TTI. In this application, the third control information is the partial control information required for scheduling the second TTI, and when the second TTI is scheduled, the complete control information for scheduling the second TTI does not need to be sent. This reduces control signaling overheads.

In some possible implementations of the first aspect, the first control information and the second control information may be coded jointly, or may be coded separately.

In some possible implementations of the first aspect, when the third control information is control information partially updated based on the second control information, the first control information, the second control information, and the third control information are corresponding to the complete control information required for scheduling the second TTI. In this case, the third control information is further merely the control information partially updated based on the second control information. Therefore, control signaling overheads are further reduced.

In some other possible implementations of the first aspect, the multiple TTIs further include a third TTI, and the method further includes:

generating fourth control information, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI; and sending the fourth control information to the UE.

In this case, the sending the fourth control information provides multiple implementations for sending control information at the multiple TTIs, so as to reduce control signaling overheads.

In some other possible implementations of the first aspect, when a third TTI is the last TTI of the multiple TTIs, if the fourth control information includes a transmission status indication, the transmission status indication in the fourth control information is an end indication; or, the method further includes:

sending an end indication to the UE, where a valid time of the end indication is a preset value, and the preset value is defined by a protocol in advance or obtained from a preset value set, and is notified to the UE by using signaling.

In this way, in this application, when scheduling the multiple TTIs is completed, the network side device can notify the UE in multiple ways.

Optionally, the method further includes:

transmitting a data block according to the complete control information for scheduling the first TTI.

In some possible implementations of the first aspect, if the third control information is the control information partially updated based on the second control information, the method further includes:

updating, by using the third control information, a transmission characteristic parameter that is in the second control information and that is corresponding to the third control information, and using updated second control information and the first control information as the complete control information for scheduling the second TTI; and transmitting a data block according to the complete control information for scheduling the second TTI.

Optionally, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

Optionally, the multiple TTIs include consecutive N TTIs. A value of N is a preset value, or obtained by the network side device from a preset value set, or obtained by the network side device from a preset value set, and is notified to the UE by using signaling. The network side device may obtain the value from the preset value set in the following manners: (1) Select based on a speed (an action speed of the UE or a speed at which a channel changes with time), where several speed levels are divided, and each level is corresponding to a value of N; (2) Select based on a user data requirement, where a data volume of a user data cache is divided into several levels, and each level is corresponding to a value of N.

Alternatively, the multiple TTIs include N TTIs in a pre-defined total period of time, and the N TTIs may be consecutive or inconsecutive, for example, the multiple TTIs include N TTIs of which two adjacent TTIs have an interval less than a preset value. Alternatively, the multiple TTIs are consecutive downlink TTIs of consecutive N TTIs excluding an uplink TTI, or consecutive uplink TTIs of consecutive N TTIs excluding a downlink TTI.

In some possible implementations of the first aspect, the third control information may be an actual value of information, in the second control information, that needs to be updated, or the third control information is a relative adjustment value relative to corresponding information, in the second control information, that needs to be updated.

According to a second aspect, this application provides a data block transmission method, where the method is used to transmit a data block at multiple TTIs, and the multiple TTIs include at least a first TTI and a second TTI; and the method includes:

receiving, by UE, first control information sent by a network side device, where the first control information is partial control information that is required for scheduling each of the multiple TTIs;

receiving, by the UE, second control information sent by the network side device, where the second control information is remaining control information, other than the first control information, in complete control information for scheduling the first TTI;

determining, by the UE according to the first control information and the second control information, complete control information for transmitting a data block at the first TTI by the UE;

transmitting, by the UE, the data block at the first TTI according to the complete control information for transmitting the data block at the first TTI by the UE;

receiving, by the UE, third control information sent by the network side device, where the third control information is partial control information required for scheduling the second TTI, and the first control information and the third control information are corresponding to complete control information required for scheduling the second TTI;

determining, by the UE according to the first control information and the third control information, complete control information for transmitting a data block at the second TTI by the UE; and transmitting, by the UE, the data block at the second TTI according to the complete control information for transmitting the data block at the second TTI by the UE.

In this embodiment, after receiving the complete control information for scheduling the first TTI, the UE needs to receive only partial information (that is, the third control information) of the complete control information for scheduling the second TTI, so that the complete control information for scheduling the second TTI can be obtained according to the third control information, to transmit the data block at the second TTI. This reduces control signaling overheads.

In some possible implementations of the second aspect, the third control information is the control information partially updated based on the second control information, and the determining, by the UE according to the first control information and the third control information, complete control information for transmitting a data block at the second TTI by the UE includes:

updating, by the UE, the second control information according to the third control information; and combining, by the UE, the first control information and updated second control information to obtain the complete control information for transmitting the data block at the second TTI by the UE.

In this way, the received third control information is the information partially updated based on the second control information, and this can further reduce control signaling overheads.

In some possible implementations of the second aspect, the multiple TTIs further include a third TTI, and the method includes:

receiving, by the UE, fourth control information sent by the network side device, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI;

determining, by the UE according to the fourth control information, complete control information for transmitting a data block at the third TTI by the UE; and transmitting, by the UE, the data block according to the complete control information for transmitting the data block at the third TTI by the UE.

In some possible implementations of the second aspect, if the fourth control information is the control information partially updated based on the second control information, and the first control information, the second control information, and the fourth control information are corresponding to the complete control information required for scheduling the third TTI, the determining, by the UE according to the fourth control information, complete control information for transmitting a data block at the third TTI by the UE includes:

updating, by the UE by using the fourth control information, a transmission characteristic parameter that is in the second control information and that is corresponding to the fourth control information, and using the first control information and updated second control information as the complete control information for transmitting the data block at the third TTI by the UE; or if the fourth control information is information partially updated based on the third control information, and the first control information, the third control information, and the fourth control information are corresponding to complete control information required for scheduling the third TTI, the determining, by the UE according to the fourth control information, complete control information for transmitting a data block at the third TTI by the UE includes:

updating, by the UE by using the fourth control information, a transmission characteristic parameter that is in the third control information and that is corresponding to the fourth control information, and using updated third control information and the first control information as the complete control information for transmitting the data block at the third TTI by the UE; or updating, by the UE by using the fourth control information, a transmission characteristic parameter that is in the complete control information for transmitting the data block at the second TTI by the UE and that is corresponding to the fourth control information, and using updated control information as the complete control information for transmitting the data block at the third TTI by the UE.

In some possible implementations of the second aspect, the multiple TTIs further include a fourth TTI; and if the UE does not receive control information for scheduling the fourth TTI, the method further includes:

using, by the UE, complete control information for transmitting a data block at a target TTI by the UE as complete control information for transmitting a data block at the fourth TTI by the UE, where the target TTI is a data block transmission TTI that is previous to the fourth TTI in the multiple TTIs, or using, by the UE, the complete control information for transmitting the data block at the first TTI by the UE as complete control information for transmitting a data block at the fourth TTI by the UE; and transmitting, by the UE, the data block at the fourth TTI according to the complete control information for transmitting the data block at the fourth TTI by the UE.

In some possible implementations of the second aspect, the third control information may be an actual value of information, in the second control information, that needs to be updated, or the third control information is a relative adjustment value relative to corresponding information, in the second control information, that needs to be updated.

In some possible implementations of the second aspect, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

According to a third aspect, this application provides a network side device, where the network side device is configured to schedule multiple transmission time intervals TTIs for data transmission, and the multiple TTIs include at least a first TTI and a second TTI; and the network side device includes:

a processor, configured to generate first control information, where the first control information is partial control information that is required for scheduling each of the multiple TTIs;

the processor is further configured to generate second control information, where the second control information is remaining control information, other than the first control information, in complete control information for scheduling the first TTI;

the processor is further configured to generate third control information, where the third control information is partial control information required for scheduling the second TTI, and the first control information and the third control information are corresponding to complete control information required for scheduling the second TTI; and a transmitter, configured to send the first control information, the second control information, and the third control information to user equipment UE.

In some possible implementations of the third aspect, when the third control information is control information partially updated based on the second control information, the first control information, the second control information, and the third control information are corresponding to the complete control information required for scheduling the second TTI.

In some possible implementations of the third aspect, the multiple TTIs further include a third TTI; and the processor is further configured to generate fourth control information, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI; and the transmitter is further configured to send the fourth control information to the UE.

In some possible implementations of the third aspect, when a third TTI is the last TTI of the multiple TTIs, if the fourth control information includes a transmission status indication, the transmission status indication in the fourth control information is an end indication; or the transmitter is further configured to send an end indication to the UE, where a valid time of the end indication is a preset value, and the preset value is defined by a protocol in advance or obtained from a preset value set, and is notified to the UE by using signaling.

Optionally, the transmitter is further configured to transmit a data block according to the complete control information for scheduling the first TTI.

In some possible implementations of the third aspect, if the third control information is the control information partially updated based on the second control information, the processor is further configured to update, by using the third control information, a transmission characteristic parameter that is in the second control information and that is corresponding to the third control information, and use updated second control information and the first control information as the complete control information for scheduling the second TTI; and a data block is transmitted according to the complete control information for scheduling the second TTI.

In some possible implementations of the third aspect, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

According to a fourth aspect, this application provides user equipment, where the user equipment is configured to transmit a data block at multiple consecutive TTIs, and the multiple TTIs include at least a first TTI and a second TTI; and the user equipment includes a processor and a transceiver, where the processor is configured to:

receive, by using the transceiver, first control information and second control information that are sent by a network side device, where the first control information is partial control information that is required for scheduling each of the multiple TTIs, and the second control information is remaining control information, other than the first control information, in complete control information for scheduling the first TTI; and determine, according to the first control information and the second control information, complete control information for transmitting a data block at the first TTI by the UE, and control, according to the complete control information for transmitting the data block at the first TTI by the UE, the transceiver to transmit the data block at the first TTI;

the processor is further configured to:

receive, by using the transceiver, third control information sent by the network side device, where the third control information is partial control information required for scheduling the second TTI, and the first control information and the third control information are corresponding to complete control information required for scheduling the second TTI;

determine, according to the first control information and the third control information, complete control information for transmitting a data block at the second TTI by the UE; and control, according to the complete control information for transmitting the data block at the second TTI by the UE, the transceiver to transmit the data block at the second TTI.

In some possible implementations of the fourth aspect, if the third control information is the control information partially updated based on the second control information, the processor is specifically configured to update, by using the third control information, a transmission characteristic parameter that is in the second control information and that is corresponding to the third control information, and use the first control information and updated second control information as the complete control information for transmitting the data block at the second TTI by the UE.

In some possible implementations of the fourth aspect, the multiple TTIs further include a third TTI; and the processor is further configured to:

receive, by using the transceiver, fourth control information sent by the network side device, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI;

determine, according to the fourth control information, complete control information for transmitting a data block at the third TTI by the UE; and control, according to the complete control information for transmitting the data block at the third TTI by the UE, the transceiver to transmit the data block.

In some possible implementations of the fourth aspect, if the fourth control information is the control information partially updated based on the second control information, and the first control information, the second control information, and the fourth control information are corresponding to the complete control information required for scheduling the third TTI, the processor is specifically configured to update, by using the fourth control information, a transmission characteristic parameter that is in the second control information and that is corresponding to the fourth control information, and use the first control information and updated second control information as the complete control information for transmitting the data block at the third TTI by the UE; or if the fourth control information is information partially updated based on the third control information, and the first control information, the third control information, and the fourth control information are corresponding to complete control information required for scheduling the third TTI, the processor is specifically configured to update, by using the fourth control information, a transmission characteristic parameter that is in the third control information and that is corresponding to the fourth control information, and use updated third control information and the first control information as the complete control information for transmitting the data block at the third TTI by the UE; or the processor is specifically configured to update, by using the fourth control information, a transmission characteristic parameter that is in the complete control information for transmitting the data block at the second TTI by the UE and that is corresponding to the fourth control information, and use updated control information as the complete control information for transmitting the data block at the third TTI by the UE.

In some possible implementations of the fourth aspect, the multiple TTIs further include a fourth TTI;

if the UE does not receive control information for scheduling the fourth TTI, the processor is further configured to use complete control information for transmitting a data block at a target TTI by the UE as complete control information for transmitting a data block at the fourth TTI by the UE, where the target TTI is a data block transmission TTI that is previous to the fourth TTI in the multiple TTIs, or the processor is further configured to use the complete control information for transmitting the data block at the first TTI by the UE as complete control information for transmitting a data block at the fourth TTI by the UE; and the processor is further configured to control, according to the complete control information for transmitting the data block at the fourth TTI by the UE, the transceiver to transmit the data block at the fourth TTI.

In some possible implementations of the fourth aspect, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

It can be learned from the foregoing technical solutions that this application has the following advantages:

In this application, the third control information used for scheduling the second TTI is merely the partial control information required for scheduling the second TTI, that is, when the second TTI is scheduled, the complete control information for scheduling the second TTI does not need to be sent. This reduces control signaling overheads.

DESCRIPTION OF EMBODIMENTS

This application provides a control information sending method, a data block transmission method, and a related apparatus, so as to reduce control signaling overheads.

To make a person skilled in the art understand the technical solutions in the present application better, the following clearly describes the technical solutions in this application with reference to the accompanying drawings in this application. Apparently, the described embodiments are merely a part rather than all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", and so on (if they exist) are intended to distinguish between similar objects but do not necessarily indicate a specific order or sequence. It should be understood that the data termed in such a way are interchangeable in proper circumstances so that the embodiments described herein can be implemented in an order other than the order illustrated or described herein. Moreover, the terms "include", "contain", and any other variants mean to cover non-exclusive inclusion, for example, a process, method, system, product, or device that includes a series of steps or units is not necessarily limited to those steps or units, but may include other steps or units that are not expressly listed or that are inherent to such a process, method, system, product, or device.

This application is applied to a mobile communications system, especially a short-TTI mobile communications system with a TTI of less than 1 ms, for example, a developing 5G mobile communications system. A scenario mainly described in this application is: In the mobile communications system, a network side device sends control information to UE to perform scheduling for the UE, so that the UE transmits a data block according to the received control information.

The following first describes an embodiment of a control information sending method according to this application.

In this application, the control information sending method is executed by a network side device, for example, a base station.

Figure 1:
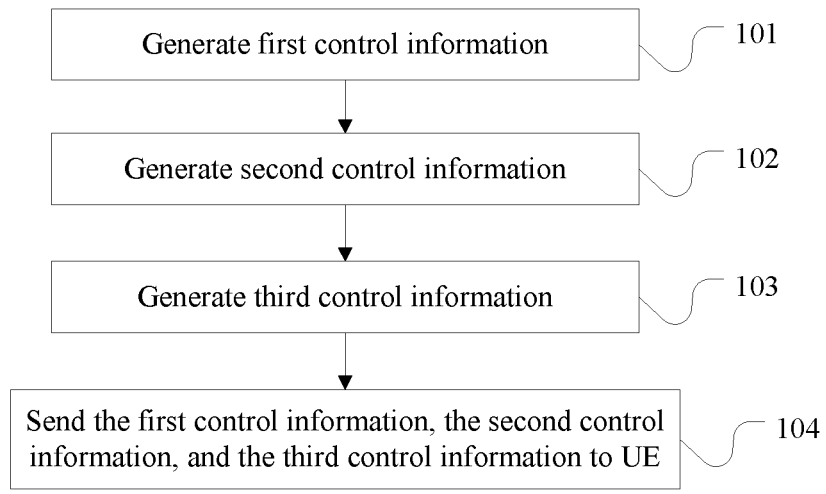
FIG. 1 is a schematic diagram of an embodiment of a control information sending method according to this application.

Referring to FIG. 1, FIG. 1 is an embodiment of a control information sending method according to this application. The method is used to schedule multiple transmission time intervals TTIs for data transmission. The multiple TTIs include at least a first TTI and a second TTI. The method includes the following steps.

101. Generate first control information, where the first control information is partial control information that is required for scheduling each of the multiple TTIs.

Generally, control information may include one or more transmission characteristic parameters, such as carrier indication information, hybrid automatic repeat request (Hybrid Automatic Repeat Request, HARQ for short) process number information, physical resource information, modulation and coding scheme (Modulation and Coding Scheme, MCS for short) information, transport block size (Transport Block Size, TBS for short) information, redundancy version (Redundancy Version, RV for short) information, new data index (New Data Index, NDI for short) information, precoding information, power control information, a coverage level, a repetition factor, a transmission status indication, and transmission length information. It can be understood that in the control information, an actual value of the transmission characteristic parameter, or a relative value of the transmission characteristic parameter (for example, a relative adjustment value relative to a corresponding transmission characteristic parameter in other control information) is used for representation. This is not limited herein.

The first control information is the partial control information that is required for scheduling each of the multiple TTIs. That is, the first control information is common control information required by each TTI when the multiple TTIs are scheduled. Information content in the common control information always remains the same. For example, the first control information may be at least one of the following transmission characteristic parameters: the carrier indication information, the HARQ process number information, the physical resource information, the MCS information, the TBS information, the RV information, the NDI information, the precoding information, the power control information, the coverage level, the repetition factor, the transmission status indication, or the transmission length information. If the first control information includes the coverage level, it indicates that coverage levels for all the TTIs are the same.

The transmission length information is applicable to a multiple-TTI joint coding scenario, and is used to control a quantity of TTIs used for sending in joint coding. The information may be updated, for example, it is initially determined to use N TTIs for sending. For example, in this application, transmission length information in control information for scheduling the first TTI is determined to be N TTIs, and as sending proceeds, N may be changed to M according to a channel change. M may be greater than or less than N. For example, in this application, transmission length information in control information for scheduling the second TTI (or a TTI after the second TTI) is M. That is, transmission length information that is sent may vary with the channel change, so as to match a channel condition to a greatest extent.

In this embodiment, the generating first control information may be generating the first control information according to a preset rule. The preset rule may be defined by a standard protocol. For example, the generating the first control information according to a preset rule may be at least one of the following:

determining that the carrier indication information and the RV information belong to the first control information;

if a quantity of UEs in a system keeps stable at the multiple TTIs, or a channel slightly changes with time, determining that the physical resource information belongs to the first control information;

if a channel slightly changes with time, or one transport block needs to be sent at the multiple TTIs, determining that the MCS information belongs to the first control information;

if a channel slightly changes with time, determining that the precoding information belongs to the first control information;

if the multiple TTIs are corresponding to one acknowledgment ACK feedback, determining that the HARQ process number information and the NDI information belong to the first control information; or generating the first control information according to all information that is determined to belong to the first control information.

102. Generate second control information, where the second control information is remaining control information, other than the first control information, in complete control information for scheduling the first TTI.

A person skilled in the art should know that complete control information for scheduling a TTI may be considered as a set A, the first control information may be considered as a subset B, the second control information may be considered as a subset C, B ∪C=A, and B∩C=0.

In this embodiment, for generation of the second control information, reference may be made to the foregoing manner of generating the first control information according to the preset rule. This is not limited herein.

The second control information is the remaining control information, other than the first control information, in the complete control information for scheduling the first TTI. In this case, the second control information is exclusive control information for scheduling the first TTI. The second control information may be at least one of the following transmission characteristic parameters: the carrier indication information, the HARQ process number information, the physical resource information, the MCS information, the TBS information, the RV information, the NDI information, the precoding information, the power control information, the coverage level, the repetition factor, the transmission status indication, or the transmission length information.

A parameter type of the second control information is different from that of the first control information. The different parameter types herein mean that the parameter types do not overlap. For example, the complete control information for scheduling the first TTI includes the carrier indication information, the HARQ process number information, the physical resource information, the MCS information, the TBS information, the RV information, the NDI information, the precoding information, the power control information, the coverage level, and the repetition factor. The first control information includes the carrier indication information, the HARQ process number information, the physical resource information, and the modulation and precoding scheme information, while the second control information includes the TBS information, the RV information, the NDI information, the precoding information, the power control information, the coverage level, and the repetition factor.

It should be noted that in this embodiment of this application, generating the first control information in step 101 and generating the second control information in step 102 may be one step. That is, the first control information and the second control information may be generated together, or may be generated separately. The first control information and the second control information may be coded jointly, or may be coded separately. This is not limited herein.

103. Generate third control information, where the third control information is partial control information required for scheduling the second TTI, and the first control information and the third control information are corresponding to complete control information required for scheduling the second TTI.

It should be known that the third control information may be considered as a subset C1, and a union set of the first control information and the third control information may be the complete control information A1 for scheduling the second TTI, that is, B∪C1=A1. It should be noted that the third control information may further be a subset of the second control information, and in this case, A1=B∪C∪C1.

In this embodiment, the third control information may be an actual value of information, in the second control information, that needs to be updated, or the third control information is a relative adjustment value relative to corresponding information, in the second control information, that needs to be updated. Using information A in the second control information as an example, it is assumed that a value of the information A is a. The third control information includes updated information of A in the second control information. The information A in the third control information may be an updated actual value of A, for example, a', or may be a relative adjustment value of a, for example, Δa.

The third control information may be third control information that is generated by the network side device according to a current network status and an instant requirement of a user. For generation of the third control information, refer to the manner of generating the first control information according to the preset rule; or generate control information with reference to the manner of generating the first control information according to the preset rule, obtain a partially updated actual value or a relative adjustment value by comparing the control information with the second control information, and use the partially updated actual value or the relative adjustment value relative to the second control information as the third control information. This is not limited herein.

104. Send the first control information, the second control information, and the third control information to UE.

In this embodiment, the first control information, the second control information, and the third control information may be sent to the UE, so as to schedule the UE to transmit a data block at the first TTI and the second TTI. The first control information and the second control information may be sent to the UE together, or may be sent to the UE separately.

It should be noted that the second TTI described in this embodiment of this application is any one TTI after the first TTI among the multiple TTIs, but not necessarily a TTI that actually ranks second among the multiple TTIs.

Because a current requirement of the user and the current network status may be considered for the third control information, the third control information may be generally generated and sent after the first control information and the second control information are sent. The third control information may be control information partially or completely updated based on the second control information. In this case, the first control information, the second control information, and the third control information are corresponding to the complete control information required for scheduling the second TTI. That is, the second control information is updated according to the third control information, and the complete control information required for scheduling the second TTI can be obtained by combining updated second control information and the first control information.

In this application, when scheduling is performed for the UE to transmit a data block in the multiple TTIs, the first control information and the second control information for scheduling the first TTI and the third control information for scheduling the second TTI are separately generated. The first control information and the second control information form the complete control information for scheduling the first TTI, and the first control information and the third control information are corresponding to the complete control information required for scheduling the second TTI. In this application, the third control information is the partial control information required for scheduling the second TTI, and when the second TTI is scheduled, the complete control information for scheduling the second TTI does not need to be sent. This reduces control signaling overheads.

Optionally, the multiple TTIs may further include a third TTI, and in this case, the method may further include:
generating fourth control information; and
sending the fourth control information to the UE, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI.

The fourth control information may be control information partially or completely updated based on the second control information. In this case, the first control information, the second control information, and the fourth control information are corresponding to the complete control information required for scheduling the third TTI. That is, after the second control information is updated according to the fourth control information, and the complete control information required for scheduling the third TTI can be obtained by combining updated second control information and the first control information. The fourth control information may be an actual value of information, in the second control information, that needs to be updated, or the fourth control information is a relative adjustment value relative to corresponding information, in the second control information, that needs to be updated.

The fourth control information may alternatively be information partially or completely updated based on the third control information. In this case, the first control information, the third control information, and the fourth control information are corresponding to the complete control information required for scheduling the third TTI. That is, after the third control information is updated according to the fourth control information, the complete control information required for scheduling the third TTI can be obtained by combining updated third control information and the first control information. The fourth control information may be an actual value of information, in the third control information, that needs to be updated, or the fourth control information is a relative adjustment value relative to corresponding information, in the third control information, that needs to be updated.

When the third control information is previous control information sent before the fourth control information, the fourth control information may alternatively be information partially or completely updated based on the third control information, that is, completely or partially updated based on the control information previously sent.

In some possible implementations of this embodiment, the multiple TTIs may also include another target TTI in addition to the first TTI, the second TTI, and the third TTI. The method may further include:

generating control information for scheduling the target TTI; and sending, to the UE, the control information for scheduling the target TTI.

If the target TTI is after the second TTI but before the third TTI, the control information for the target TTI may be partial or all updated information of the second control information, and the first control information, the second control information, and the control information for the target TTI are corresponding to complete control information required for scheduling the target TTI; or the control information for the target TTI is partial or all updated information of the third control information, and the first control information, the third control information, and the control information for the target TTI are corresponding to complete control information required for scheduling the target TTI; or the control information for the target TTI is partial or all updated information of control information sent at a TTI previous to the target TTI.

If the target TTI is after the third TTI, control information for the target TTI is partial or all updated information of the third control information, and the first control information, the third control information, and the control information for the target TTI are corresponding to complete control information required for scheduling the target TTI; or the control information for the target TTI is partial or all updated information of control information sent at a TTI previous to the target TTI.

In this embodiment of this application, if the third control information, the fourth control information, and control information sent for scheduling another target TTI are an update of a part of control information that is sent at a previous TTI (for example, the second control information), a corresponding part in complete control information for scheduling the previous TTI may be used as a corresponding part that is not updated in complete control information for scheduling the second TTI, the third TTI, and the another target TTI.

Figure 2:
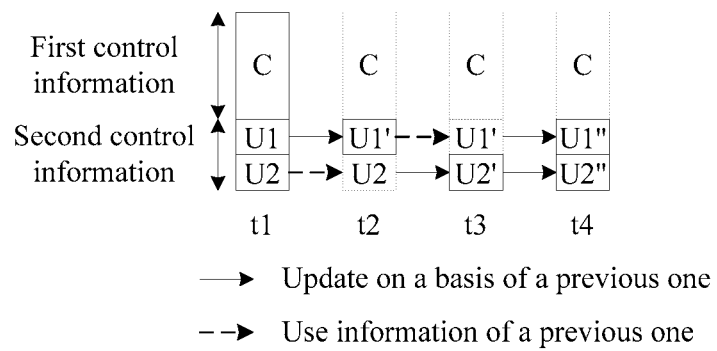
FIG. 2 is a schematic diagram of a specific control information sending embodiment according to this application.

As shown in FIG. 2, that control information is an update on a basis of previous control information is used as an example. It is assumed that the complete control information for scheduling the first TTI includes C, U1, and U2, where the first control information is C, and the second control information includes U1 and U2. At a moment t1, the network side device sends, to the UE, the complete control information for scheduling the first TTI. At a moment t2, the third control information for scheduling the second TTI is sent, and the third control information includes U1' only, and U1' is an update of U1 in the second control information (which may be an actual value, or may be a relative adjustment value). The other part (C and U2) in the complete control information for scheduling the second TTI remains the same as that in the complete control information for scheduling the first TTI. At a moment t3, the fourth control information for scheduling the third TTI is sent, the fourth control information includes UT only, and a corresponding part in the complete control information for scheduling the second TTI, such as C and U1', are used as the other part in the complete control information for scheduling the third TTI.

Likewise, for generation of the fourth control information, reference may be made to the manner of generating the first control information according to the preset rule. This is not limited herein.

It should be noted that the third TTI described in this embodiment of this application is any one TTI after the first TTI and the second TTI among the multiple TTIs, but not necessarily a TTI that actually ranks third among the multiple TTIs.

Optionally, the multiple TTIs include consecutive N TTIs. A value of N is a preset value, or obtained by the network side device from a preset value set, or obtained by the network side device from a preset value set, and is notified to the UE by using signaling. The network side device may obtain the value from the preset value set in the following manners: (1) Select based on a speed (an action speed of the UE or a speed at which a channel changes with time), where several speed levels are divided, and each level is corresponding to a value of N; (2) Select based on a user data requirement, where a data volume of a user data cache is divided into several levels, and each level is corresponding to a value of N.

Alternatively, the multiple TTIs include N TTIs in a pre-defined total period of time, and the N TTIs may be consecutive or inconsecutive, for example, the multiple TTIs include N TTIs of which two adjacent TTIs have an interval less than a preset value. Alternatively, the multiple TTIs are consecutive downlink TTIs of consecutive N TTIs excluding an uplink TTI, or consecutive uplink TTIs of consecutive N TTIs excluding a downlink TTI.

In some embodiments of this application, when the third TTI is the last TTI of the multiple TTIs, if the fourth control information includes a transmission status indication, the transmission status indication in the fourth control information is an end indication; or if the fourth control information includes a transmission status indication, the method may further include:

sending an end indication to the UE, where a valid time of the end indication is a preset value, and the preset value is defined by a protocol in advance or obtained from a preset value set, and is notified to the UE by using signaling.

Optionally, in this embodiment of this application, after control information is sent to the UE, a data block may be further transmitted to the UE. For example, after the network side device sends the first control information and the second control information to the UE, the method may further include:

transmitting the data block according to the complete control information for scheduling the first TTI (that is, the control information that includes the first control information and the second control information).

For another example, after the network side device sends the first control information, the second control information, and the third control information to the UE, if the third control information is control information partially updated based on the second control information, the method may further include:

updating, by using the third control information, a transmission characteristic parameter that is in the second control information and that is corresponding to the third control information, and using updated second control information and the first control information as the complete control information for scheduling the second TTI.

In this embodiment of this application, if the UE works in a single-input mode, for example, a signal-input multiple-output (Single Input Multiple Out, SIMO for short) mode, or a single-input single-output (single input single output, SISO for short) mode, the method may further include:

when each complete control information corresponding to the multiple TTIs is control information that instructs to send a data block, successively sending, by the network side device, one data block or multiple data blocks to the UE according to each complete control information corresponding to the multiple TTIs, where the network side device performs independent coding on a data block to be sent at each of the multiple TTIs, or the network side device performs joint coding on data blocks to be sent at all of the multiple TTIs; or when each complete control information corresponding to the multiple TTIs is control information that instructs to receive a data block, successively receiving, by the network side device according to each complete control information corresponding to the multiple TTIs, one data block or multiple data blocks sent by the UE, where the network side device performs independent decoding on a data block received at each of the multiple TTIs, or the network side device performs joint decoding on data blocks received at all of the multiple TTIs.

In this embodiment of this application, if the UE works in a multiple-input mode, for example, a multiple-input multiple-output (Multiple-Input Multiple-Output, MIMO for short) system, the method may further include:

when each complete control information corresponding to the multiple TTIs is control information that instructs to send a data block, successively sending, by the network side device, a group of data blocks to the UE according to each complete control information corresponding to the multiple TTIs, where the group of data blocks are sent by the network side device through different channels at a same TTI; or successively sending, by the network side device, a group of target data blocks to the UE according to each complete control information corresponding to the multiple TTIs, where the group of target data blocks are sent through different channels at the multiple TTIs, and each target data block includes data blocks sent through each channel at all of the multiple TTIs; or when each complete control information corresponding to the multiple TTIs is control information that instructs to receive a data block, successively receiving, by the network side device according to each complete control information corresponding to the multiple TTIs, a group of data blocks sent by the UE, where the group of data blocks are sent by the UE through different channels at a same TTI; or successively receiving, by the network side device according to each complete control information corresponding to the multiple TTIs, a group of target data blocks sent by the UE, where the group of target data blocks are sent by the UE through different channels at the multiple TTIs, and each target data block includes data blocks sent by the UE through each channel at all of the multiple TTIs.

The following describes an embodiment of a data block transmission method according to this application.

Figure 3:
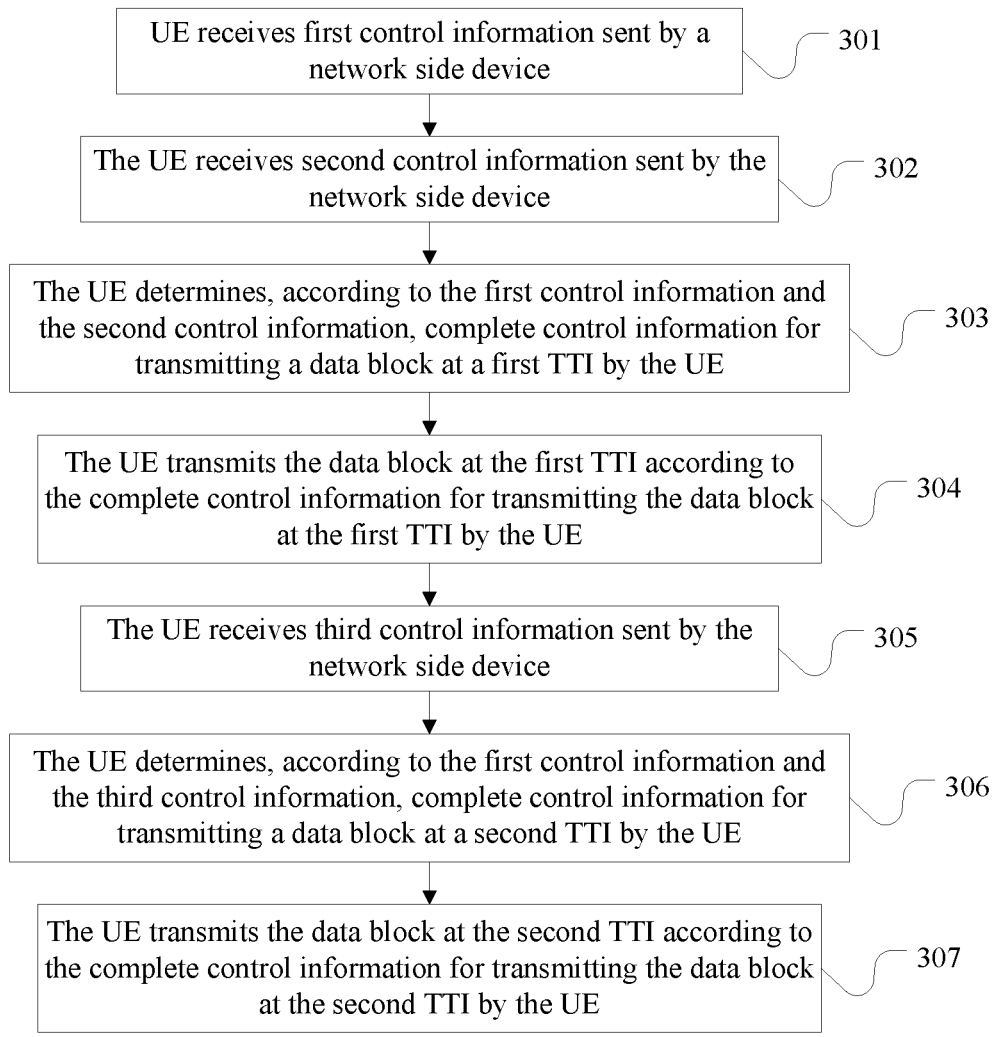
FIG. 3 is a schematic diagram of an embodiment of a data block transmission method according to this application.

FIG. 3 is an embodiment of a data block transmission method according to this application. The method is used to transmit a data block at multiple consecutive TTIs, and the multiple TTIs include at least a first TTI and a second TTI. The method includes the following steps.

301. UE receives first control information sent by a network side device, where the first control information is partial control information that is required for scheduling each of the multiple TTIs.

302. The UE receives second control information sent by the network side device, where the second control information is remaining control information, other than the first control information, in complete control information for scheduling the first TTI.

Similar to that when the network side device sends the first control information and the second control information, herein, the first control information and the second control information in step 301 and step 302 may be received together, or may be received separately, and the first control information and the second control information may be decoded jointly, or may be decoded separately. This is not limited herein.

303. The UE determines, according to the first control information and the second control information, complete control information for transmitting a data block at the first TTI by the UE.

Because the first control information and the second control information form the complete control information for scheduling the first TTI, the complete control information for transmitting the data block at the first TTI by the UE can be determined according to the first control information and the second control information.

304. The UE transmits the data block at the first TTI according to the complete control information for transmitting the data block at the first TTI by the UE.

305. The UE receives third control information sent by the network side device, where the third control information is partial control information required for scheduling the second TTI, and the first control information and the third control information are corresponding to complete control information required for scheduling the second TTI.

306. The UE determines, according to the first control information and the third control information, complete control information for transmitting a data block at the second TTI by the UE.

Because the first control information and the third control information are corresponding to the complete control information required for scheduling the second TTI, the complete control information for transmitting the data block at the second TTI by the UE can be determined according to the first control information and the third control information.

307. The UE transmits the data block at the second TTI according to the complete control information for transmitting the data block at the second TTI by the UE.

In this application, the UE receives the first control information and the second information for scheduling the first TTI and the third control information for scheduling the second TTI. The first control information and the second control information form the complete control information for scheduling the first TTI, and the first control information and the third control information are corresponding to the complete control information required for scheduling the second TTI. In this application, the third control information is the partial control information required for scheduling the second TTI, and when the second TTI is scheduled, the complete control information for scheduling the second TTI does not need to be received. This reduces control signaling overheads.

Optionally, the third control information is the control information partially updated based on the second control information, and the determining, by the UE according to the first control information and the third control information, complete control information for transmitting a data block at the second TTI by the UE includes:

updating, by the UE by using the third control information, a transmission characteristic parameter that is in the second control information and that is corresponding to the third control information; and using, by the UE, the first control information and updated second control information as the complete control information for transmitting the data block at the second TTI by the UE.

Optionally, the multiple TTIs further include a third TTI, and the method includes:

receiving, by the UE, fourth control information sent by the network side device, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI;

determining, by the UE according to the fourth control information, complete control information for transmitting a data block at the third TTI by the UE; and transmitting, by the UE, the data block according to the complete control information for transmitting the data block at the third TTI by the UE.

Optionally, if the fourth control information is the control information partially updated based on the second control information, and the first control information, the second control information, and the fourth control information are corresponding to the complete control information required for scheduling the third TTI, the determining, by the UE according to the fourth control information, complete control information for transmitting a data block at the third TTI by the UE includes:

updating, by the UE by using the fourth control information, a transmission characteristic parameter that is in the second control information and that is corresponding to the fourth control information, and using the first control information and updated second control information as the complete control information for transmitting the data block at the third TTI by the UE; or if the fourth control information is information partially updated based on the third control information, and the first control information, the third control information, and the fourth control information are corresponding to complete control information required for scheduling the third TTI, the determining, by the UE according to the fourth control information, complete control information for transmitting a data block at the third TTI by the UE includes:

updating, by the UE by using the fourth control information, a transmission characteristic parameter that is in the third control information and that is corresponding to the fourth control information, and using updated third control information and the first control information as the complete control information for transmitting the data block at the third TTI by the UE; or updating, by the UE by using the fourth control information, a transmission characteristic parameter that is in the complete control information for transmitting the data block at the second TTI by the UE and that is corresponding to the fourth control information, and using updated control information as the complete control information for transmitting the data block at the third TTI by the UE.

In some embodiments of this application, the multiple TTIs further include a fourth TTI; and if the UE does not receive control information for scheduling the fourth TTI, the method further includes:

using, by the UE, complete control information for transmitting a data block at a target TTI by the UE as complete control information for transmitting a data block at the fourth TTI by the UE, where the target TTI is a data block transmission TTI that is previous to the fourth TTI in the multiple TTIs. It can be understood that, if control information for scheduling the target TTI is neither received for the target TTI, complete control information for transmitting a data block at a data block transmission TTI that is previous to the target TTI in the multiple TTIs may be used; and so on. Certainly, the complete control information for transmitting the data block at the first TTI may alternatively be used for the target TTI, that is, the complete control information for transmitting the data block at the first TTI by the UE is used as the complete control information for transmitting the data block at the target TTI by the UE; or using, by the UE, the complete control information for transmitting the data block at the first TTI by the UE as complete control information for transmitting a data block at the fourth TTI by the UE; and transmitting, by the UE, the data block at the fourth TTI according to the complete control information for transmitting the data block at the fourth TTI by the UE.

Optionally, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

It should be noted that in this embodiment, for a part similar to that in the foregoing embodiment, reference may be made to related descriptions in the foregoing embodiment, and details are not repeated herein. For example, for selecting the multiple TTIs and a manner of sending, by the UE, the data block at the multiple TTIs, reference may be made to related descriptions in the foregoing control information sending method.

The following describes an embodiment of a network side device according to the embodiments of this application.

Figure 4:
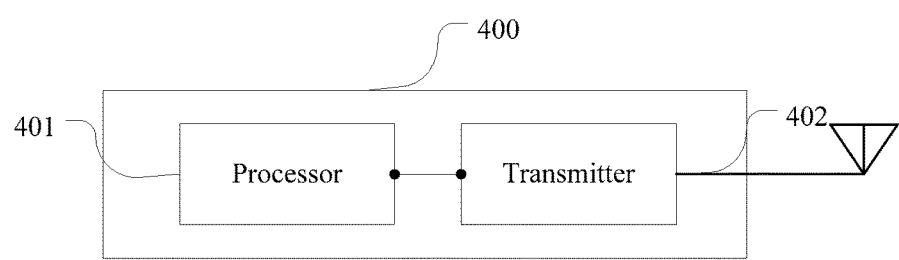
FIG. 4 is a schematic diagram of an embodiment of a network side device according to this application.

FIG. 4 is an embodiment of a network side device according to this application. The network side device 400 is configured to schedule multiple transmission time intervals TTIs for data transmission. The multiple TTIs include at least a first TTI and a second TTI. The network side device 400 may include a network side device, such as a base station (Base Station) or an access point (Access point). The network side device 400 includes:

a processor 401, configured to generate first control information, where the first control information is partial control information that is required for scheduling each of the multiple TTIs, and it should be noted that the processor 401 herein may be specifically a device configured to process a communication algorithm, for example, a baseband processor or a communications processor;

the processor 401 is further configured to generate second control information, where the second control information is remaining control information, other than the first control information, in complete control information for scheduling the first TTI;

the processor 401 is further configured to generate third control information, where the third control information is partial control information required for scheduling the second TTI, and the first control information and the third control information are corresponding to complete control information required for scheduling the second TTI; and a transmitter 402, configured to send the first control information, the second control information, and the third control information to user equipment UE.

In this application, when scheduling is performed for the UE to transmit a data block in the multiple TTIs, the first control information and the second control information for scheduling the first TTI and the third control information for scheduling the second TTI are separately generated. The first control information and the second control information form the complete control information for scheduling the first TTI, and the first control information and the third control information are corresponding to the complete control information required for scheduling the second TTI. In this application, the third control information is the partial control information required for scheduling the second TTI, and when the second TTI is scheduled, the complete control information for scheduling the second TTI does not need to be sent. This reduces control signaling overheads.

Optionally, when the third control information is control information partially updated based on the second control information, the first control information, the second control information, and the third control information are corresponding to the complete control information required for scheduling the second TTI.

In some embodiments of this application, the multiple TTIs further include a third TTI; and the processor is further configured to generate fourth control information, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI; and the transmitter is further configured to send the fourth control information to the UE.

In some embodiments of this application, when a third TTI is the last TTI of the multiple TTIs, if the fourth control information includes a transmission status indication, the transmission status indication in the fourth control information is an end indication; or the transmitter 402 is further configured to send an end indication to the UE, where a valid time of the end indication is a preset value, and the preset value is defined by a protocol in advance or obtained from a preset value set, and is notified to the UE by using signaling.

Optionally, the transmitter 402 is further configured to transmit a data block according to the complete control information for scheduling the first TTI.

Optionally, if the third control information is the control information partially updated based on the second control information, the processor 401 is further configured to update, by using the third control information, a transmission characteristic parameter that is in the second control information and that is corresponding to the third control information, and use updated second control information and the first control information as the complete control information for scheduling the second TTI; and a data block is transmitted according to the complete control information for scheduling the second TTI.

Optionally, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

The following describes an embodiment of user equipment according to this application.

Figure 5:
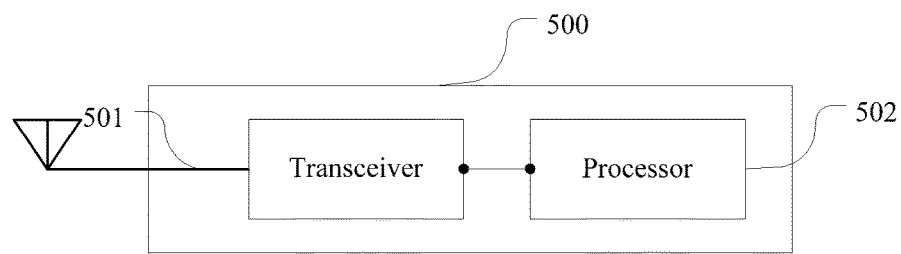
FIG. 5 is a schematic diagram of an embodiment of user equipment according to this application.

FIG. 5 is an embodiment of user equipment according to this application. The user equipment 500 is configured to transmit a data block at multiple consecutive TTIs, and the multiple TTIs include at least a first TTI and a second TTI. The user equipment 500 includes a processor 502 and a transceiver 501. A person skilled in the art should know that the transceiver may also be referred to as transmitting and receiving equipment that has receive and transmit functions.

The processor 502 is configured to:

receive, by using the transceiver 501, first control information and second control information that are sent by a network side device, where the first control information is partial control information that is required for scheduling each of the multiple TTIs, and the second control information is remaining control information, other than the first control information, in complete control information for scheduling the first TTI; and determine, according to the first control information and the second control information, complete control information for transmitting a data block at the first TTI by the UE, and control, according to the complete control information for transmitting the data block at the first TTI by the UE, the transceiver 501 to transmit the data block at the first TTI.

The processor 502 is further configured to:

receive, by using the transceiver 501, third control information sent by the network side device, where the third control information is partial control information required for scheduling the second TTI, and the first control information and the third control information are corresponding to complete control information required for scheduling the second TTI;

determine, according to the first control information and the third control information, complete control information for transmitting a data block at the second TTI by the UE; and control, according to the complete control information for transmitting the data block at the second TTI by the UE, the transceiver 501 to transmit the data block at the second TTI.

In this embodiment, after receiving the complete control information for scheduling the first TTI, the UE needs to receive only partial information (that is, the third control information) of the complete control information for scheduling the second TTI, so that the complete control information for scheduling the second TTI can be obtained according to the third control information, to transmit the data block at the second TTI. This reduces control signaling overheads.

In some embodiments of this application, if the third control information is the control information partially updated based on the second control information, the processor 502 is specifically configured to update, by using the third control information, a transmission characteristic parameter that is in the second control information and that is corresponding to the third control information, and use the first control information and updated second control information as the complete control information for transmitting the data block at the second TTI by the UE.

In some embodiments of this application, the multiple TTIs further include a third TTI; and the processor 502 is further configured to:

receive, by using the transceiver 501, fourth control information sent by the network side device, where the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI;

determine, according to the fourth control information, complete control information for transmitting a data block at the third TTI by the UE; and control, according to the complete control information for transmitting the data block at the third TTI by the UE, the transceiver 501 to transmit the data block.

In some embodiments of this application, if the fourth control information is the control information partially updated based on the second control information, and the first control information, the second control information, and the fourth control information are corresponding to the complete control information required for scheduling the third TTI, the processor 502 is specifically configured to update, by using the fourth control information, a transmission characteristic parameter that is in the second control information and that is corresponding to the fourth control information, and use the first control information and updated second control information as the complete control information for transmitting the data block at the third TTI by the UE; or if the fourth control information is information partially updated based on the third control information, and the first control information, the third control information, and the fourth control information are corresponding to complete control information required for scheduling the third TTI, the processor 502 is specifically configured to update, by using the fourth control information, a transmission characteristic parameter that is in the third control information and that is corresponding to the fourth control information, and use updated third control information and the first control information as the complete control information for transmitting the data block at the third TTI by the UE; or the processor 502 is specifically configured to update, by using the fourth control information, a transmission characteristic parameter that is in the complete control information for transmitting the data block at the second TTI by the UE and that is corresponding to the fourth control information, and use updated control information as the complete control information for transmitting the data block at the third TTI by the UE.

In some embodiments of this application, the multiple TTIs further include a fourth TTI;

if the UE does not receive control information for scheduling the fourth TTI, the processor 502 is further configured to use complete control information for transmitting a data block at a target TTI by the UE as complete control information for transmitting a data block at the fourth TTI by the UE, where the target TTI is a data block transmission TTI that is previous to the fourth TTI in the multiple TTIs, or the processor 502 is further configured to use the complete control information for transmitting the data block at the first TTI by the UE as complete control information for transmitting a data block at the fourth TTI by the UE; and the processor 502 is further configured to control, according to the complete control information for transmitting the data block at the fourth TTI by the UE, the transceiver 501 to transmit the data block at the fourth TTI.

Optionally, the first control information and the second control information each include at least one of the following transmission characteristic parameters: carrier indication information, hybrid automatic repeat request HARQ process number information, physical resource information, modulation and coding scheme information, TBS information, redundancy version information, new data index NDI information, precoding information, power control information, a coverage level, a repetition factor, a transmission status indication, or transmission length information; and a parameter type of the first control information is different from that of the second control information.

It should be noted that in this embodiment of the present application, the transceiver 501 may be an independent apparatus, or may be formed by two independent apparatuses, that is, a transmitter and a receiver, where the transmitter is configured to send data in this embodiment, and the receiver is configured to receive data in this embodiment. This is not limited herein.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be noted that, to make the description brief, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that all the embodiments described in the specification are example embodiments, and the related actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A control information sending method, wherein the method is used to schedule multiple transmission time intervals (TTIs) for data transmission, and the multiple TTIs comprise at least a first TTI and a second TTI; and
the method comprises:
generating first control information, wherein the first control information is partial control information that is required for scheduling each of the multiple TTIs;
generating second control information, wherein the second control information is remaining control information, other than the first control information, in complete control information for scheduling the first TTI;
generating third control information, wherein the third control information is partial control information required for scheduling the second TTI, and the first control information and the third control information are corresponding to complete control information required for scheduling the second TTI; and
sending the first control information, the second control information, and the third control information to user equipment (UE).

2. The method according to claim 1, wherein
when the third control information is control information partially updated based on the second control information, the first control information, the second control information, and the third control information are corresponding to the complete control information required for scheduling the second TTI.

3. The method according to claim 1, wherein the multiple TTIs further comprise a third TTI, and the method further comprises:
generating fourth control information, wherein the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI; and
sending the fourth control information to the UE.

4. The method according to claim 3, wherein
when a third TTI is the last TTI of the multiple TTIs, and when the fourth control information comprises a transmission status indication,
the transmission status indication in the fourth control information is an end indication.

5. The method according to claim 1, wherein the method further comprises:
sending an end indication to the UE,
wherein a valid time of the end indication is a preset value.

6. The method according to claim 1, wherein
the method further comprises:
transmitting a data block according to the complete control information for scheduling the first TTI.

7. The method according to claim 1, wherein
when the third control information is the control information partially updated based on the second control information,
the method further comprises:
updating, by using the third control information, a transmission characteristic parameter that is in the second control information and that is corresponding to the third control information, and using updated second control information and the first control information as the complete control information for scheduling the second TTI; and
transmitting a data block according to the complete control information for scheduling the second TTI.

8. The method according to claim 1, wherein
the first control information and the second control information each comprise at least one of the following transmission characteristic parameters: carrier indication information, hybrid automatic repeat request (HARQ) process number information, physical resource information, modulation and coding scheme information, transport block size (TBS) information, redundancy version information, new data index (NDI) information, precoding information, power control information, a coverage level, a repetition factor, a transmission status indication, or transmission length information; and a parameter type of the first control information is different from that of the second control information.

9. A data block transmission method, wherein the method is used to transmit a data block at multiple TTIs, and the multiple TTIs comprise at least a first TTI and a second TTI; and the method comprises:
   receiving, by UE, first control information sent by a network side device, wherein the first control information is partial control information that is required for scheduling each of the multiple TTIs;
   receiving, by the UE, second control information sent by the network side device, wherein the second control information is remaining control information, other than the first control information, in complete control information for scheduling the first TTI;
   determining, by the UE according to the first control information and the second control information, complete control information for transmitting a data block at the first TTI by the UE;
   transmitting, by the UE, the data block at the first TTI according to the complete control information for transmitting the data block at the first TTI by the UE;
   receiving, by the UE, third control information sent by the network side device, wherein the third control information is partial control information required for scheduling the second TTI, and the first control information and the third control information are corresponding to complete control information required for scheduling the second TTI;
   determining, by the UE according to the first control information and the third control information, complete control information for transmitting a data block at the second TTI by the UE; and
   transmitting, by the UE, the data block at the second TTI according to the complete control information for transmitting the data block at the second TTI by the UE.

10. The method according to claim 9, wherein
the third control information is control information partially updated based on the second control information, and
the determining, by the UE according to the first control information and the third control information, complete control information for transmitting a data block at the second TTI by the UE comprises:
   updating, by the UE by using the third control information, a transmission characteristic parameter that is in the second control information and that is corresponding to the third control information; and
   using, by the UE, the first control information and updated second control information as the complete control information for transmitting the data block at the second TTI by the UE.

11. The method according to claim 9, wherein the multiple TTIs further comprise a third TTI, and the method comprises:
   receiving, by the UE, fourth control information sent by the network side device, wherein the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI;
   determining, by the UE according to the fourth control information, complete control information for transmitting a data block at the third TTI by the UE; and
   transmitting, by the UE, the data block according to the complete control information for transmitting the data block at the third TTI by the UE.

12. The method according to claim 11, wherein
when the fourth control information is the control information partially updated based on the second control information, and the first control information, the second control information, and the fourth control information are corresponding to the complete control information required for scheduling the third TTI, the determining, by the UE according to the fourth control information, complete control information for transmitting a data block at the third TTI by the UE comprises:
   updating, by the UE by using the fourth control information, a transmission characteristic parameter that is in the second control information and that is corresponding to the fourth control information, and using the first control information and updated second control information as the complete control information for transmitting the data block at the third TTI by the UE.

13. The method according to claim 11, wherein
when the fourth control information is information partially updated based on the third control information, and the first control information, the third control information, and the fourth control information are corresponding to complete control information required for scheduling the third TTI, the determining, by the UE according to the fourth control information, complete control information for transmitting a data block at the third TTI by the UE comprises:
   updating, by the UE by using the fourth control information, a transmission characteristic parameter that is in the third control information and that is corresponding to the fourth control information, and using updated third control information and the first control information as the complete control information for transmitting the data block at the third TTI by the UE; or
   updating, by the UE by using the fourth control information, a transmission characteristic parameter that is in the complete control information for transmitting the data block at the second TTI by the UE and that is corresponding to the fourth control information, and using updated control information as the complete control information for transmitting the data block at the third TTI by the UE.

14. The method according to claim 9, wherein
the multiple TTIs further comprise a fourth TTI; and
when the UE does not receive control information for scheduling the fourth TTI, the method further comprises:
   using, by the UE, complete control information for transmitting a data block at a target TTI by the UE as complete control information for transmitting a data block at the fourth TTI by the UE, wherein the target TTI is a data block transmission TTI that is previous to the fourth TTI in the multiple TTIs, or using, by the UE, the complete control information for transmitting the data block at the first TTI by the UE as complete control information for transmitting a data block at the fourth TTI by the UE; and transmitting, by the UE, the data block at the fourth TTI according to the complete control information for transmitting the data block at the fourth TTI by the UE.

15. The method according to claim 9, wherein
the first control information and the second control information each comprise at least one of the following transmission characteristic parameters: carrier indication information, hybrid automatic repeat request (HARQ) process number information, physical resource information, modulation and coding scheme information, TBS information, redundancy version information, new data index (NDI) information, precoding information, power control information, a coverage level, a repetition factor, a transmission status indication, or transmission length information; and a parameter type of the first control information is different from that of the second control information.

16. A network side device, wherein the network side device is configured to schedule multiple transmission time intervals TTIs for data transmission, and the multiple TTIs comprise at least a first TTI and a second TTI; and the network side device comprises:
a processor, configured to generate first control information, wherein the first control information is partial control information that is required for scheduling each of the multiple TTIs;
the processor is further configured to generate second control information, wherein the second control information is remaining control information, other than the first control information, in complete control information for scheduling the first TTI;
the processor is further configured to generate third control information, wherein the third control information is partial control information required for scheduling the second TTI, and the first control information and the third control information are corresponding to complete control information required for scheduling the second TTI; and
a transmitter, configured to send the first control information, the second control information, and the third control information to user equipment UE.

17. The network side device according to claim 16, wherein
when the third control information is control information partially updated based on the second control information, the first control information, the second control information, and the third control information are corresponding to the complete control information required for scheduling the second TTI.

18. The network side device according to claim 16, wherein
the multiple TTIs further comprise a third TTI; and
the processor is further configured to generate fourth control information, wherein the fourth control information is control information partially updated based on the second control information, and the first control information, the second control information, and the fourth control information are corresponding to complete control information required for scheduling the third TTI; or the fourth control information is information partially updated based on the third control information, and the first control information, the third control information, and the fourth control information are corresponding to complete control information required for scheduling the third TTI; and
the transmitter is further configured to send the fourth control information to the UE.

19. User equipment, wherein the user equipment is configured to transmit a data block at multiple TTIs, and the multiple TTIs comprise at least a first TTI and a second TTI; and the user equipment comprises a processor and a transceiver, wherein
the processor is configured to:
receive, by using the transceiver, first control information and second control information that are sent by a network side device, wherein the first control information is partial control information that is required for scheduling each of the multiple TTIs, and the second control information is remaining control information, other than the first control information, in complete control information for scheduling the first TTI; and
determine, according to the first control information and the second control information, complete control information for transmitting a data block at the first TTI by the UE, and control, according to the complete control information for transmitting the data block at the first TTI by the UE, the transceiver to transmit the data block at the first TTI;
the processor is further configured to:
receive, by using the transceiver, third control information sent by the network side device, wherein the third control information is partial control information required for scheduling the second TTI, and the first control information and the third control information are corresponding to complete control information required for scheduling the second TTI;
determine, according to the first control information and the third control information, complete control information for transmitting a data block at the second TTI by the UE; and
control, according to the complete control information for transmitting the data block at the second TTI by the UE, the transceiver to transmit the data block at the second TTI.

20. The user equipment according to claim 19, wherein
the third control information is control information partially updated based on the second control information, and
the processor is specifically configured to update, by using the third control information, a transmission characteristic parameter that is in the second control information and that is corresponding to the third control information, and use the first control information and updated second control information as the complete control information for transmitting the data block at the second TTI by the UE.

* * * * *